Patented May 29, 1934

1,961,045

UNITED STATES PATENT OFFICE 1,961,045

FLAME-PROOFING COMPOSITION OF MATTER AND PROCESS FOR MAKING THE SAME

Frederick W. Hochstetter, Pittsburgh, Pa., assignor to Treesdale Laboratories, Inc., a corporation of Delaware No Drawing. Application January 12, 1933, Serial No. 651,363

13 Claims. (Cl. 134—78.6)

The present invention comprehends a composition of matter for use in flame-proofing cellulosic materials and their derivatives and to a process for compounding the same.

I am aware that it is not broadly new with me to utilize aqueous solutions for flame-proofing various media such as textiles. There are a number of formulæ for aqueous flame-proofing solutions which are produced merely by dissolving in water certain soluble salts readily purchased on the open market. Attempts by those skilled in the art to produce non-inflammable products by treating various media with such solutions have resulted in substantial failure due to technical and physical reasons well known to those skilled in the art. Even after the finished product was secured it was found that there was no protection against fungus attacks particularly where the product was subjected to moisture. Again, the use of water-soluble salts or other solids proved ineffective where the materials were thereafter subjected to water such as rain or washing water or the like with the result that the flame-proofing characteristics were destroyed. Moreover, products made by treatment with such salts were not rendered immune to attack by vermin, thermacides, etc. A further disadvantage lay in the excessive cost as relatively large quantities of such salts had to be used and in most cases they merely formed physically adherent films or layers on the textile materials which constituted a non-permanent association and hence non-permanent flame-proofing characteristics.

By the present invention I have overcome the technical, physical and economical disadvantages and therein lies one of the objects of the present invention.

Another object of my invention resides in providing an aqueous flame-proofing composition for cellulosic materials and their derivatives which is simple to make, inexpensive and which effectively immunizes the media to which it is applied against fire, fungus, vermin, thermacides, etc.

A further object of my invention resides in the production of an aqueous flame-proofing composition containing in combination oxygen, hydrogen, nitrogen, chlorine and sulphur with water and, if desired, with phenol, formaldehyde, or both.

A still further object of my invention resides in adapting the flame-proofing composition of matter to any cellulosic material whether it be acid, alkali or neutral in nature and whether or not it be previously colored or dyed.

A still further object of my invention resides in the provision of a composition of matter of the nature indicated which unites permanently with the cellulosic material thus having a permanent effect thereupon.

Other and further objects and advantages will be pointed out hereinafter or will be understood by those skilled in the art or by the layman.

In general, the composition of matter forming the subject matter of the present invention is compounded by bringing together hydrogen, oxygen, nitrogen, chlorine, and sulphur in the form of suitable compounds in the presence of water and in the manner hereinafter more fully pointed out.

I may derive the necessary elements from suitable liquids containing hydrogen, oxygen, nitrogen, chlorine and sulphur, preferably from oxygen- and hydrogen-containing acids or acid groups and including ammonia.

As a specific example, of one manner of carrying out the present process and for producing the present composition of matter, with the understanding that it is an example only and is not a limitation express or implied upon the invention or inventions herein contained, I add to an open vessel containing 5,000 c. c. of water at 65° F. 2000 c. c. of hydrochloric acid at 80° F. in a fine stream under constant stirring. I find that under the conditions of operation there is generally a certain amount of effervescence but I continue the stirring until the effervescence has more or less ceased after which I add 2000 c. c. of ammonia at a temperature of 75° F. in suitable fashion. The ammonia is followed by 200 c. c. of acetic acid, making sure that thorough mixing is accomplished by sufficient stirring or agitation, after which I add 400 c. c. of sulphuric acid at a temperature of 65° F., whereupon stirring is continued for at least about five minutes and ammonia again added in the amount of 2000 c. c. at 65° F.

Following the second addition of ammonia just mentioned, I stir constantly and slowly until any effervescence has ceased whereupon I then add 200 c. c. of phenol solution under constant stirring. I then cover the vessel and put it in a suitable digester for one hour for ageing purposes, the interior of the digester being maintained at about 75° F. Finally I add 400 c. c. of formaldehyde and again stir for about five minutes after which the aqueous composition of matter is filtered and is then ready for use.

The various liquids or materials mentioned in the example are used in full strengths preferably or in those strengths commonly available on the market in which form they are ordinarily sold, such as U. S. P. or commercial strength. It is to be understood, however, that the strengths of the liquids are subject to considerable variation due regard being given to the nature of the material being treated. When more dilute liquids are used I may omit a corresponding amount of the original water to which the liquids are added.

It will be readily understood that some media require or withstand flame-proofing compositions of greater strength than others, but that sometimes it is necessary to apply the composition of matter in a more diluted state in order not to destroy the tensile strength of the medium, that is, it is clear that by proper variation in the strengths of the materials used in compounding the composition of matter I may effect the so-called end point making the reaction of the composition of matter as a whole either acid, basic or neutral, the specific end point being properly selected for the particular medium being flame-proofed. This is of further importance where the medium, which may be fabric, linen, or other textile material, has been previously colored or dyed in which case it is necessary to predetermine whether such coloration has an acid, alkali or neutral reaction. It is obvious that too much acid or too much alkali in my composition of matter may have deleterious effects upon the coloring matter or upon the medium itself so that the composition of matter should be balanced either for acid or alkali with these facts in mind.

For instance, in treating some products the amount of acetic acid may be reduced or even omitted entirely and in that event the temperatures of the water and all the ingredients during the compounding of the composition of matter should be lower than those specified to prevent overheating of the compound such as that which may be caused by any interactions between the constituents added. Care should also be exercised in adding the sulphuric acid, as is well known to those skilled in handling sulphuric acid. If too large a stream or force of acid is allowed to flow into the water a violent reaction will take place as soon as the sulphuric acid comes into contact with the surface of the water in the vessel and, therefore, the sulphuric acid should be added at a relatively low temperature and/or in a very fine stream, preferably by gravity feed.

I also take care in compounding the composition of matter that the vapors or gases escaping during the mixing operations should not combine with each other in order to prevent the formation of salts which are capable of being formed when ammonia and hydrochloric acid vapors or ammonia and sulphuric acid vapors are allowed to combine. The manner in which this is prevented will be understood from the example given above and in general any action which occurs upon the addition of each successive ingredient or liquid is allowed to run its course fully and to substantially subside before the next succeeding ingredient or liquid is added.

When the composition of matter is produced as above explained any suitable medium such as a cellulosic material, a ligno-cellulosic material and their derivatives, which may, in specific examples, be suitable textile fabrics of various natures or various fibrous boards or fabricated shapes of such materials, I find that I have produced a composition of matter which in some way unites or combines with the materials themselves to which they are applied rendering a permanent effect. The treated material is not only non-inflammable but is immune to attack by fungus, vermin, thermacides, etc. and at the same time is non-hygroscopic in the presence of moisture or water and finally is simple, satisfactory, and economical. The composition of matter is, moreover, uniformly taken up by the materials treated therewith.

As I have already stated the above is intended in an illustrative rather than in a limitative sense and I find that I may make certain additions, omissions, modifications and substitutions without departing from the general spirit and scope of the invention. It is clear that I am not limited exactly to the temperatures hereinabove specified but such temperatures represent certain optimum conditions which I have discoverd by experimentation. Substantial variations may be made from the above temperatures to satisfy the maximum number of conditions.

Again, the amounts of the various materials added may be subject to some variation depending mainly upon the precise strength of the materials themselves and also upon the net result to be obtained as to end reaction or the like. I may further obtain the hydrogen, oxygen, nitrogen, chlorine and sulphur from other available or equivalent materials or compounds than specified although in general I find that the five elements mentioned plus phenol and formaldehyde produce the best all around results for general purposes.

What I claim as new and desire to secure by Letters Patent is:

1. A process for compounding an aqueous composition of matter for flame-proofing cellulosic materials and their derivatives without the formation of solid salts comprising the steps of successively adding to about 5000 c. c. of water at about 65° F. the following reagents in commercal strengths in about the proportions and at about the temperatures specified: to wit, 2000 c. c. of hydrochloric acid at 80° F.;
2000 c. c. of ammonia at 75° F.;
200 c. c. of acetic acid;
400 c. c. of sulphuric acid at 65° F.;
2000 c. c. of ammonia at 65° F.;
200 c. c. of phenol solution; and
400 c. c. of formaldehyde.

2. A process for compounding an aqueous composition of matter for flame-proofing cellulosic materials and their derivatives without the formation of solid salts comprising the steps of successively adding to about 5000 c. c. of water at about 65° F. the following reagents in full strengths in about the proportions and at about the temperatures specified: to wit, 2000 c. c. of hydrochloric acid at 80° F. in a fine stream under constant stirring;
2000 c. c. of ammonia at 75°F. after subsidence;
200 c. c. of acetic acid under thorough agitation;
400 c. c. of sulphuric acid at 65° F. followed by stirring for at least five minutes;
2000 c. c. of ammonia at 65° F. followed by stirring until subsidence;
200 c. c. of phenol solution under constant stirring followed by digesting for about one hour at 75° F.; and
400 c. c. of formaldehyde followed by stirring; and finally filtering the resultant composition.

3. A composition of matter adapted to flame proof cellulosic media composed of the products of reaction of the following ingredients in commercial strengths in substantially the following relative proportions:

5000 c. c. of water;
2000 c. c. of hydrochloric acid;
4000 c. c. of ammonia;
200 c. c. of acetic acid;
400 c. c. of sulphuric acid;
200 c. c. of phenol solution; and
400 c. c. of formaldehyde.

4. A composition of matter adapted to flame proof cellulosic media composed of the products of reaction of the following ingredients in substantially the following relative proportions:

5000 c. c. of water;
2000 c. c. of hydrochloric acid;
4000 c. c. of ammonia;
200 c. c. of acetic acid;
400 c. c. of sulphuric acid;
200 c. c. of phenol solution; and
400 c. c. of formaldehyde, said ingredients being of commercial strengths and together characterized by the power to impart permanently to cellulosic materials and their derivatives resistance to flame, fungus, vermin and thermacides.

5. In combination, a cellulosic material and a flame-proofing composition of matter composed of the products of reaction of the following ingredients in substantially the following relative proportions:

5000 c. c. of water;
2000 c. c. of hydrochloric acid;
4000 c. c. of ammonia;
200 c. c. of acetic acid;
400 c. c. of sulphuric acid;
200 c. c. of phenol solution; and
400 c. c. of formaldehyde, said ingredients being of commercial strengths and together characterized by the power to impart permanently to cellulosic materials and their derivatives resistance to flame, fungus, vermin and thermacides.

6. An aqueous composition of matter free from solid salts which is characterized by the capacity of permanently rendering cellulosic materials immune to flame, fungus, vermin and thermacides; by being water insoluble when applied to such cellulosic materials despite the presence in the composition of substances generally considered to be water soluble; by improving the tensile strength of such cellulosic materials when the latter are treated with the composition; and by being selectively acid, basic or neutral; said composition of matter being composed of the products of reaction, insofar as their affinities and concentrations enable them to react, plus unreacted residues, in the approximate proportions of five parts water, two parts hydrochloric acid, four parts ammonia, 0.2 parts acetic acid, 0.4 parts sulphuric acid, 0.2 parts phenol, and 0.4 parts formaldehyde, each being of commercial strength and these substances being so interassociated as to be unidentifiable as such or as generally recognized compounds but so as to form complex physico-chemical addition and reaction products yielding new technical results.

7. A composition of matter adapted to flameproof cellulosic media and containing, in addition to water, the products of reaction, plus unreacted residues, of approximately two parts commercial strength hydrochloric acid, four parts commercial strength ammonia, .2 parts commercial strength acetic acid, and .4 parts commercial strength sulphuric acid.

8. In combination, a cellulosic material and a flame-proofing composition of matter composed of the products of reaction of the following ingredients in approximately the following relative proportions:

5000 c. c. of water;
2000 c. c. of hydrochloric acid;
4000 c. c. of ammonia;
200 c. c. of acetic acid;
400 c. c. of sulphuric acid, said ingredients being of commercial strengths and together characterized by the power to impart permanently to cellulosic materials and their derivatives resistance to flame, fungus, vermin and thermacides.

9. An aqueous composition of matter free from solid salts which is characterized by the capacity of permanently rendering cellulosic materials immune to flame, fungus, vermin and thermacides; by being water insoluble when applied to such cellulosic materials despite the presence in the composition of substances generally considered to be water soluble; by improving the tensile strength of such cellulosic materials when the latter are treated with the composition; and by being selectively acid, basic or neutral; said composition of matter being composed of the products of reaction, insofar as their affinities and concentrations enable them to react, plus unreacted residues, in the approximate proportions of five parts water, two parts hydrochloric acid, four parts ammonia, 0.2 parts acetic acid, 0.4 parts sulphuric acid, these substances being so interassociated as to be unidentifiable as such or as generally recognized compounds but so as to form complex physico-chemical addition and reaction products yielding new technical results, as calculated on the basis of commercial strengths of reagents.

10. An aqueous composition of matter adapted to flameproof cellulosic media and containing, in addition to water, the products of reaction, plus any unreacted residues, of approximately 496 grams of hydrochloric acid, approximately 992 grams of ammonia, approximately 58 grams of acetic acid, and approximately 413 grams of sulphuric acid.

11. An aqueous composition of matter adapted to flameproof cellulosic media and composed of, in addition to water, the products of reaction, plus any unreacted residues, of approximately 496 grams of hydrochloric acid, approximately 992 grams of ammonia, approximately 58 grams of acetic acid, approximately 413 grams of sulphuric acid, approximately 11 grams of phenol, and approximately 114 grams of formaldehyde.

12. In combination a cellulosic material and a flameproofing composition of matter composed of the products of reaction of the following ingredients in approximately the following relative proportions:

5000 c. c. of water;
2000 c. c. of hydrochloric acid;
4000 c. c. of ammonia;
400 c. c. of sulphuric acid, said ingredients being of commercial strengths and together characterized by the power to impart permanently to cellulosic materials and their derivatives resistance to flame, fungus, vermin and thermacides.

13. In combination, a cellulosic material and a flameproofing composition of matter composed of the products of reaction of the following ingredients in approximately the following relative proportions:

5000 c. c. of water;
4000 c. c. of ammonia;
200 c. c. of acetic acid;
400 c. c. of sulphuric acid, said ingredients being of commercial strengths and together characterized by the power to impart permanently to cellulosic materials and their derivatives resistance to flame, fungus, vermin and thermacides.

FREDERICK W. HOCHSTETTER.